United States Patent
Fukuda

(10) Patent No.: US 7,954,692 B2
(45) Date of Patent: Jun. 7, 2011

(54) STRUCTURE AND METHOD FOR JOINING MEMBERS OF STRUCTURE VIA FRICTION STIR PROCESSING

(75) Inventor: Hiroshi Fukuda, Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 12/518,142

(22) PCT Filed: Dec. 14, 2007

(86) PCT No.: PCT/JP2007/001398
§ 371 (c)(1),
(2), (4) Date: Jun. 8, 2009

(87) PCT Pub. No.: WO2008/072380
PCT Pub. Date: Jun. 19, 2008

(65) Prior Publication Data
US 2010/0012706 A1    Jan. 21, 2010

(30) Foreign Application Priority Data

Dec. 15, 2006 (JP) .................. 2006-339029
Jan. 26, 2007 (JP) .................. 2007-016943

(51) Int. Cl.
*B23K 20/12* (2006.01)
*B22D 3/00* (2006.01)
(52) U.S. Cl. .................. 228/112.1; 428/544
(58) Field of Classification Search ....... 228/112.1–115, 228/2.1, 2.3; 428/544
See application file for complete search history.

(56) References Cited

U.S. PATENT DOCUMENTS

| | | | | | |
|---|---|---|---|---|---|
| 2,214,339 | A | * | 9/1940 | McKee | 29/889.6 |
| 2,319,468 | A | * | 5/1943 | Harold et al. | 52/668 |
| 2,779,998 | A | * | 2/1957 | Bailey | 228/114 |
| 2,795,039 | A | * | 6/1957 | Hutchins | 228/114 |
| 3,477,115 | A | * | 11/1969 | Martin et al. | 228/114.5 |
| 3,848,389 | A | * | 11/1974 | Gapp et al. | 411/504 |
| 5,263,247 | A | * | 11/1993 | Adachi et al. | 29/845 |
| 6,067,839 | A | * | 5/2000 | Xie | 72/391.8 |
| 6,360,937 | B1 | * | 3/2002 | De Koning | 228/112.1 |
| 6,843,404 | B2 | * | 1/2005 | Litwinski et al. | 228/2.1 |

(Continued)

FOREIGN PATENT DOCUMENTS

JP    52 123358    10/1977

(Continued)

OTHER PUBLICATIONS

U.S. Appl. No. 12/093,738, filed May 15, 2008, Fukuda.

(Continued)

*Primary Examiner* — Kiley Stoner
*Assistant Examiner* — Carlos Gamino
(74) *Attorney, Agent, or Firm* — Oblon, Spivak, McClelland, Maier & Neustadt, L.L.P.

(57) ABSTRACT

An auxiliary member is inserted into holes of opposite portions of a main member such that opposite ends of the auxiliary member extend outwardly through the holes. A joining tool is pushed, while being rotated, against one of the ends of the auxiliary member, so that the material of the auxiliary member softened due to frictional heat and plastic flow is deformed and pushed inside the main member via the hole. The tool is released to allow the plastic flow portion of the auxiliary member into solidification. Then, a similar operation is performed with respect to the other end of the auxiliary member.

3 Claims, 6 Drawing Sheets

U.S. PATENT DOCUMENTS

| | | | |
|---|---|---|---|
| 6,843,405 B2 * | 1/2005 | Okamoto et al. | 228/112.1 |
| 6,933,057 B2 * | 8/2005 | Young et al. | 428/593 |
| 7,347,641 B2 * | 3/2008 | Prichard | 403/408.1 |
| 7,367,487 B2 * | 5/2008 | Murakawa et al. | 228/112.1 |
| 7,398,911 B2 * | 7/2008 | Slattery et al. | 228/112.1 |
| 7,665,651 B2 * | 2/2010 | Aota et al. | 228/112.1 |
| 7,726,541 B2 * | 6/2010 | Maciel | 228/112.1 |
| 2001/0052178 A1 * | 12/2001 | Luhm | 29/525.06 |
| 2003/0075584 A1 * | 4/2003 | Sarik et al. | 228/2.1 |
| 2003/0118419 A1 * | 6/2003 | Easterbrook et al. | 411/1 |
| 2004/0155094 A1 * | 8/2004 | Okamoto et al. | 228/112.1 |
| 2007/0215675 A1 * | 9/2007 | Barnes | 228/112.1 |
| 2009/0094813 A1 | 4/2009 | Fukuda | |
| 2009/0236403 A1 * | 9/2009 | Feng et al. | 228/112.1 |

FOREIGN PATENT DOCUMENTS

| | | |
|---|---|---|
| JP | 11 179569 | 7/1999 |
| JP | 2000 141066 | 5/2000 |
| JP | 2002 137071 | 5/2002 |
| JP | 2003 266183 | 9/2003 |
| JP | 2003-266183 A * | 9/2003 |
| JP | 2003 266184 | 9/2003 |
| JP | 2004 17084 | 1/2004 |
| JP | 2004 106037 | 4/2004 |
| JP | 2004 136365 | 5/2004 |
| JP | 2005288444 A * | 10/2005 |
| JP | 2006061983 A * | 3/2006 |
| JP | 2006 136906 | 6/2006 |
| JP | 2006 289409 | 10/2006 |
| WO | WO 2004043642 A1 * | 5/2004 |

OTHER PUBLICATIONS

U.S. Appl. No. 12/447,919, filed Apr. 30, 2009, Fukuda.
U.S. Appl. No. 12/447,495, filed Apr. 28, 2009, Tanaka, et al.
U.S. Appl. No. 12/513,026, filed Apr. 30, 2009, Fukuda.
U.S. Appl. No. 12/518,142, filed Jun. 8, 2009, Fukuda.

* cited by examiner (a)

(b)

(a)

(b)

STRUCTURE AND METHOD FOR JOINING MEMBERS OF STRUCTURE VIA FRICTION STIR PROCESSING

TECHNICAL FIELD

The present invention relates to a method and a structure for joining members.

BACKGROUND ART

Friction stir welding or joining is a method for interconnecting members to be joined without fusion (see, for example, Patent Literature 1).

In the method, a workpiece comprising stacked members to be joined together is rested on a support tool or backing member. While rotated, a joining tool is pushed against the workpiece to assimilate together the materials softened due to frictional heat and plastic flow through stirring.

Then, the joining tool is released from the workpiece to allow the assimilated materials to solidify, thereby joining the members together.

The joining tool comprises a cylindrical shoulder and a short cylindrical pin coaxially contiguous with the shoulder, protruded as a tip of the tool and smaller in outer diameter than the shoulder.

A technique of integrating two hollow extruded shapes made of aluminum alloy and arranged side by side into a structure, using friction stir welding or joining, has been also proposed (see, for example, Patent Literature 2).

[Patent Literature 1] JP 2004-136365A
[Patent Literature 2] JP 2002-137071A

SUMMARY OF INVENTION

Technical Problems

A shape with cross-section constituted by two face plates interconnected through ribs exhibits more stiffness than the face plates and ribs themselves owing to their cooperation. However, in some situations, a shape with locally enhanced stiffness is requested.

In order to comply with the request, it is conceivable that the ribs between the two face plates may be increased in number. This, however, results in increase in overall weight of the shape and thus increase in cost since the ribs exist all over the length of the shape.

The invention was made in view of the above and has its object to provide a method and structure for joining members suited for reinforcement of a shape.

Solution to Problems

In order to attain the above-mentioned object, the invention provides forming a hole on a first portion of a main member and a hole on a second portion of the main member opposite to said first portion, said holes facing oppositely to each other, inserting an auxiliary member into the holes such that tip and base ends of the auxiliary member are in the holes of the second and first portion of the main member, respectively, rotating and pushing a joining tool against the tip end of the auxiliary member to clamp the second portion of the main member in a direction of thickness thereof by material of the auxiliary member softened due to frictional heat and plastic flow, then releasing the joining tool from the main member to allow the plastic flow portion of the auxiliary member to solidify, further rotating and pushing the joining tool against the base end of the auxiliary member to clamp the first portion of the main member in the direction of thickness thereof by material of the auxiliary member softened due to frictional heat and plastic flow, and then releasing the joining tool from the main member to allow the plastic flow portion of the auxiliary member to solidify.

The invention provides a main member having first and second portions formed with respective holes opposite to each other and an auxiliary member with tip and base ends being in the holes of the second and first portions of the main member, respectively, the tip and base ends of said auxiliary member being shaped to clamp the first and second portions of said main member in a direction of thickness thereof due to frictional heat and plastic flow, respectively.

The invention provides a main member having first and second portions formed with respective holes opposite to each other, an auxiliary member with tip and base ends being in the holes of the second and first portions of the main member, respectively, and a flange on the base end of the auxiliary member so as to engage with the first portion, the tip and base ends of said auxiliary member being shaped to clamp the first and second portions of said main member in a direction of thickness thereof due to frictional heat and plastic flow, respectively.

The invention provides a main member having first and second portions formed with respective holes opposite to each other, an auxiliary member with tip and base ends being in the holes of the second and first portions of the main member, respectively, and an additional member fitted over said base or tip end of the auxiliary member and abutting on the main member, the tip and base ends of said auxiliary member being shaped to clamp the first and second portions of said main member and the additional member in a direction of thickness thereof due to frictional heat and plastic flow.

The invention provides a main member having first and second portions formed with respective holes opposite to each other, an auxiliary member with tip and base ends being in the holes of the second and first portions of the main member, respectively, and an additional member fitted over said base or tip end of said auxiliary member and abutting on the main member, the tip and base ends of said auxiliary member being shaped to clamp the first and second portions of said main member in a direction of thickness thereof due to frictional heat and plastic flow and being assimilated with the additional member.

The invention provides a main member having first and second portions formed with respective holes opposite to each other, an auxiliary member with tip and base ends being in the holes of the second and first portions of the main member, respectively, a first additional member fitted over the base end of the auxiliary member and abutting on the main member and a second additional member fitted over the tip end of said auxiliary member and abutting on the main member, the tip and base ends of said auxiliary member being shaped to clamp the first and second portions of said main member and the first and second additional members in a direction of thickness thereof due to frictional heat and plastic flow.

The invention provides a main member having first and second portions formed with respective holes opposite to each other, an auxiliary member with tip and base ends being in the holes of the second and first portions of the main member, respectively, a first additional member fitted over the base end of the auxiliary member and abutting on the main member and a second additional member fitted over the tip end of said auxiliary member and abutting on the main member, the tip and base ends of said auxiliary member being shaped to clamp the first and second portions of said main member in a direction of thickness thereof due to frictional heat and plastic flow and being assimilated with first and second additional member.

Advantageous Effects Of Invention

According to a method and structure for joining members of the invention, the following excellent effects and advantages can be obtained.
(1) Since the base and tip ends of the auxiliary member are shaped to clamp the first and second portions in a direction of thickness thereof due to frictional heat and plastic flow, the stiffness of the main member can be locally increased without substantially increasing in weight the main member.
(2) Stiffness enhancement of the main member and attachment of the additional member are concurrently completed, leading to reduction in number of procedures for assembling the members.

Figure 1:
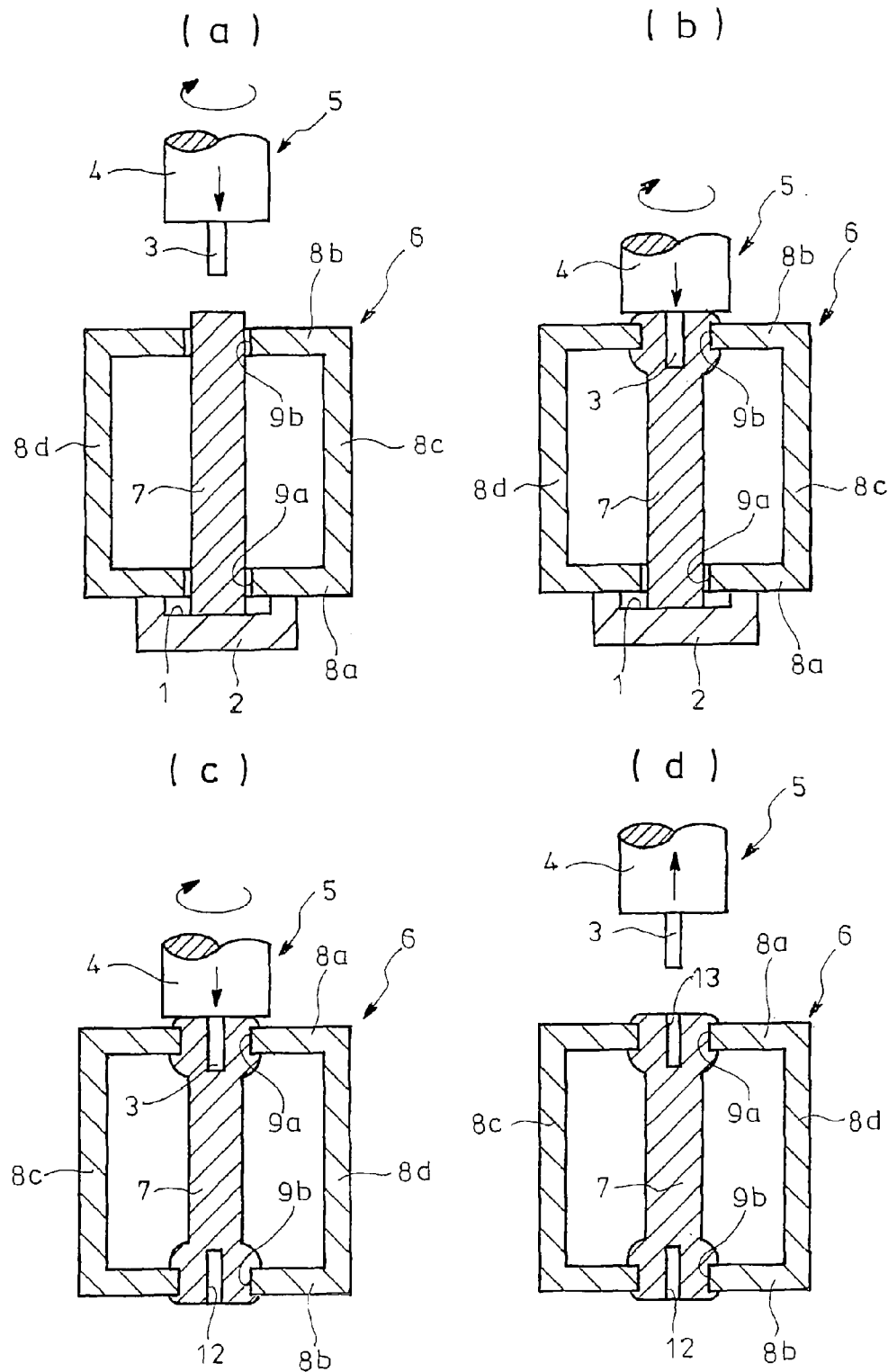
FIG. 1 includes schematic diagrams showing construction sequence of a first embodiment of a structure for joining members according to the invention.

REFERENCE SIGNS LIST 6 main member
7 auxiliary member
8a first portion
8b second portion
9a hole
9b hole
15 flange
16 auxiliary member
21 additional member (first additional member)
24 additional member (first additional member)
26 additional member (second additional member)
28 additional member (second additional member)

DESCRIPTION OF EMBODIMENTS

Embodiments of the invention will be described in conjunction with the drawings.
FIG. 1 is directed to a first embodiment of a structure for joining members according to the invention. Used are a backing member 2 with a recess 1 and a joining tool 5 with a short cylindrical pin 3 coaxially contiguous with a tip surface of a cylindrical shoulder 4 so as to join a round-bar-like auxiliary member 7 to a main member 6 in the form of a hollow shape with a rectangular section.

The auxiliary member 7 is made of aluminum alloy, the main member 6, backing member 2 and joining tool 5 being made of steel harder than and higher in softening temperature than aluminum alloy.

The main member 6 having a first portion 8a and a second portion 8b opposing thereto, each of the portions 8a and 8b being formed with holes 9a and 9b, respectively, is arranged such that a tip end of the auxiliary member 7 is received by the recess 1 of the backing member 2, the base and tip ends of the member 7 being in the holes 9a and 9b of the first and second portions 8a and 8b, respectively, the joining tool 5 facing the tip end of the auxiliary member 7 (see (a) of FIG. 1).

The holes 9a and 9b may be drilled round ones when the auxiliary member 7 is a round bar; when the member 7 is a square bar or a plate, the holes 9a and 9ab may be, for example, machined correspondingly.

The pin 3 is pushed, while the joining tool 5 is rotated, against the tip end of the auxiliary member 7, so that the pin 3 gradually goes in the portion of the member softened due to frictional heat and plastic flow.

Soon, the end surface of the shoulder 4 of the joining tool 5 is pushed against the tip end of the auxiliary member 7, so that material derived from the tip end of the member 7 softened due to frictional heat and plastic flow is pushed inside the main member 6 via the hole 9b of the second portion 8b (see (b) of FIG. 1).

Pushing of the pin 3 of the rotated joining tool 5 against the tip end of the round-bar-like auxiliary member 7 may initially cause axial rotation of the member 7.

Such rotation of the auxiliary member 7 will cease as the material is softened; alternatively, the rotation of the auxiliary member 7 may be blocked, using a clamp or other mechanical means.

Pressing force of the joining tool 5 is transmitted via the auxiliary member 7 to the backing member 2, so that no buckling deformation is caused on third and fourth portions 8c and 8d between the first and second portions 8a and 8b of the main member 6.

Then, the joining tool 5 is released from the auxiliary member 7 to allow into solidification the plastic flow portion of the member 7 clamping the second portion 8b around the hole 9b in the direction of thickness of the member, the base end of the auxiliary member 7 being released from the backing member 2. The auxiliary member 7 is turned inside out, the deformed tip end of the member 7 being received by the backing member (not shown), the joining tool 5 facing the base end of the auxiliary member 7.

The pin 3 is pushed, while the joining tool 5 is rotated, against the base end of the auxiliary member 7, so that the pin 3 gradually goes in the portion of the member softened due to frictional heat and plastic flow.

Soon, the end surface of the shoulder 4 of the joining tool 5 is pushed against the base end of the auxiliary member 7, so that material derived from the base end of the member 7 softened due to frictional heat and plastic flow is pushed inside the main member 6 via the hole 9a of the first portion 8a (see (c) of FIG. 1).

The plastic flow portion of the tip end of the auxiliary member 7 has closely contacted with the second portion 8b of the main member 6 into solidification, so that no rotation of the round-bar-like auxiliary member 7 is caused.

Pressing force of the joining tool 5 is transmitted via the auxiliary member 7 to the second portion 8b, so that no buckling deformation is caused on the third and fourth portions 8c and 8d between the first and second portions 8a and 8b of the main member 6.

Then, the joining tool 5 is released from the auxiliary member 7 to allow into solidification the plastic flow portion of the member 7 clamping the first portion 8a around the hole 9a in the direction of thickness thereof (see (d) of FIG. 1).

Thus, the plastic flow portions of the tip and base ends of the auxiliary member 7 clamp the second and first portions 8b and 8a of the main member 6, respectively, thus attaining locally enhanced stiffness of the main member 6.

Holes 12 and 13 of the tip and base ends of the auxiliary member 7 produced by release of the ingoing pin of the joining tool 5 may be threaded for possible bolting of further members.

Figure 2:
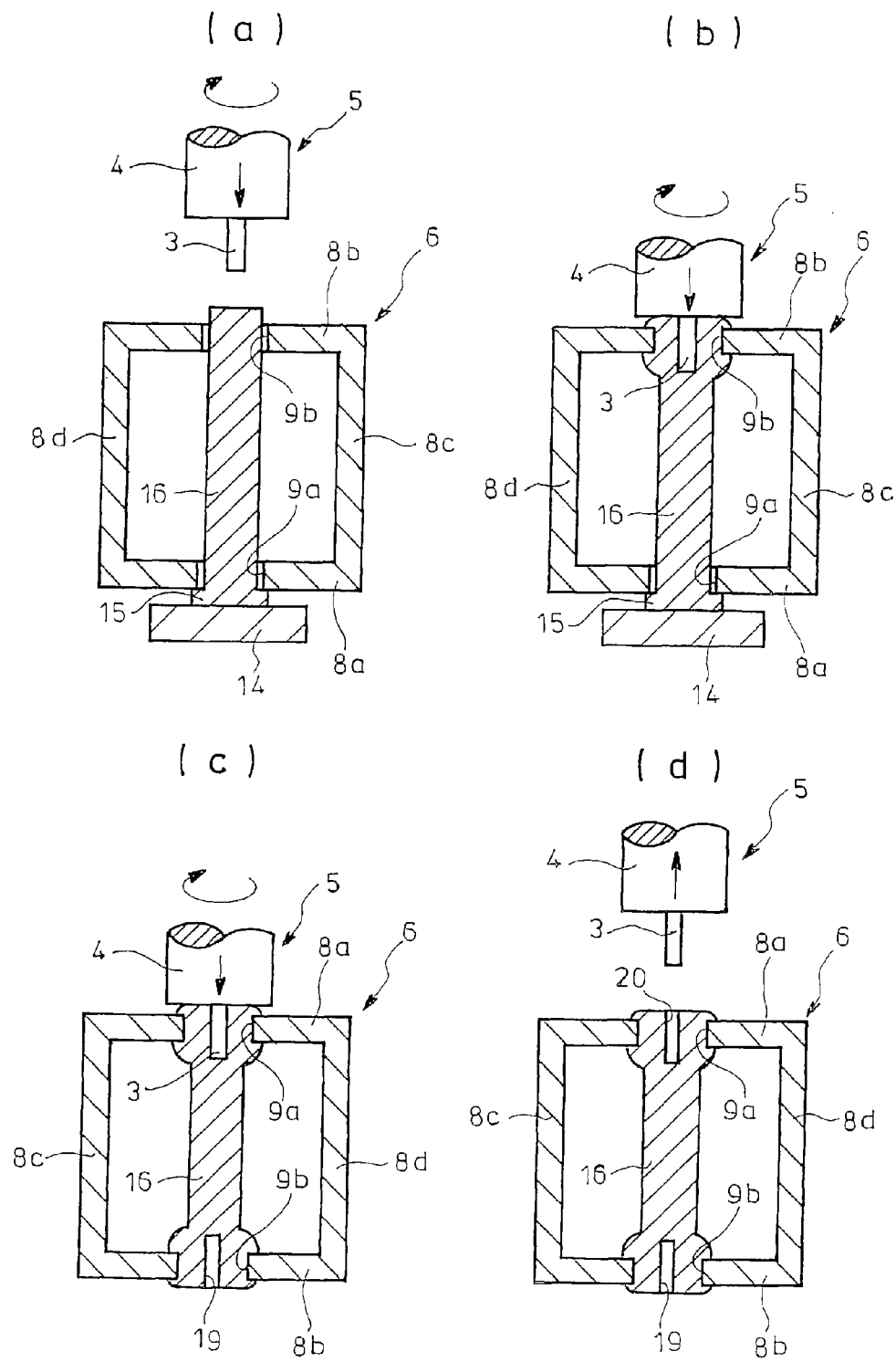
FIG. 2 includes schematic diagrams showing construction sequence of a second embodiment of a structure for joining members according to the invention.

FIG. 2 is directed to a second embodiment of a structure for joining members according to the invention in which parts similar to those in FIG. 1 are represented by the same reference numerals.

In this embodiment, a flat backing member 14 and the above-mentioned joining tool 5 are used for joining, to the main member 6 in the form of a hollow shape with rectangular section, of a round-bar-like auxiliary member with a base end formed with a flange 15 abutting on a first portion 8a of the main member.

The auxiliary member 16 is made of aluminum alloy, the backing member 14 being made of steel harder than and higher in softening temperature than aluminum alloy.

The main member 6 is arranged such that the flange 15 of the auxiliary member 16 is received by the backing member 14, the base and tip ends of the auxiliary member extending through the holes 9a and 9b of the first and second portions 8a and 8b, respectively, the first portion 8a being rested on the flange 15, the joining tool 5 facing the tip end of the auxiliary member 16 (see (a) of FIG. 2).

The pin 3 is pushed, while the joining tool 5 is rotated, against the tip end of the auxiliary member 16, so that the pin 3 gradually goes in the portion of the member softened due to frictional heat and plastic flow.

Soon, the end face of the shoulder 4 of the joining tool 5 is pushed against the tip end of the auxiliary member 16, so that material derived from the tip end of the auxiliary member 16 softened due to frictional heat and plastic flow is pushed inside the main member 6 via the hole 9b of the second portion 8b (see FIG. 2(*b*)). Pushing of the pin 3 of the rotated joining tool 5 against the tip end of the round-bar-like auxiliary member may initially cause axial rotation of the auxiliary member 16.

Such rotation of the auxiliary member 16 will cease as the material is softened; alternatively, the rotation of the auxiliary member 16 may be blocked, using a clamp or other mechanical means.

Pressing force of the joining tool 5 is transmitted via the auxiliary member 16 to the backing member 14, so that no buckling deformation is caused on third and fourth portions 8c and 8d between the first and second portion 8a and 8b) of the main member 6.

Then, the joining tool 5 is released from the auxiliary member 16 to allow into solidification the plastic flow portion of the member 16 clamping the second portion 8b of the main member 6 around the hole 9b in the direction of thickness thereof, the base end of the auxiliary member 7 being released from the backing member 14. The members 6 and 16 are turned inside out, the deformed tip end of the auxiliary member 16 being received by the backing member (not shown), the joining tool 5 facing the base end of the auxiliary member 16.

The pin 3 is pushed, while the joining tool 5 is rotated, against the base end of the auxiliary member 16, so that the pin 3 gradually goes in the portion of the member softened due to frictional heat and plastic flow.

Soon, the end surface of the shoulder 4 of the joining tool 5 is pushed against the flange 15 of the auxiliary member 16, so that material derived from the flange 15 of the member 16 softened due to the frictional heat and plastic flow is pushed inside the main member 6 via the hole 9a of the first portion 8a (see (c) of FIG. 2).

The plastic flow portion of the tip end of the auxiliary member 16 has closed contacted with the second portion 8b of the main member 6 into solidification, so that no rotation of the auxiliary member 16 is caused.

Pressing force of the joining tool 5 is transmitted via the auxiliary member 16 to the second portion 8b, so that no buckling deformation is caused on the third and fourth portions 8c and 8d between the first and second portions 8a and 8b of the main member 6.

Then, the joining tool 5 is released from the auxiliary member 16 to allow into solidification the plastic flow portion of the member 16 clamping the first portion 8a of the main member 6 in the direction of thickness thereof (see (d) of FIG. 2).

Thus, the plastic flow portions of the tip and base ends of the auxiliary member 16 clamp the second and first portions 8b and 8a of the main member 6, respectively, thus attaining locally enhanced stiffness of the main member 6.

Holes 19 and 20 of the tip and base ends of the auxiliary member 16 produced by release of the ingoing pin 3 of the joining tool 5 may be threaded for possible bolting of further members.

Figure 3:
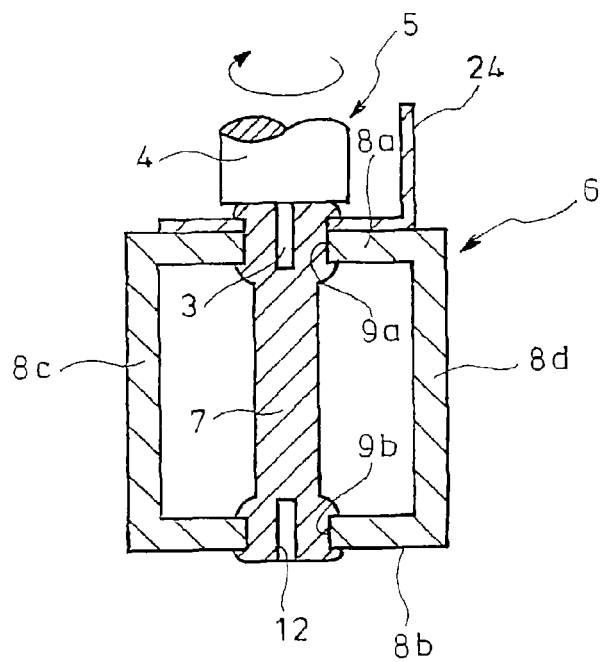
FIG. 3 includes schematic diagrams showing construction sequence of a third embodiment of a structure for joining members according to the invention.
Figure 3:
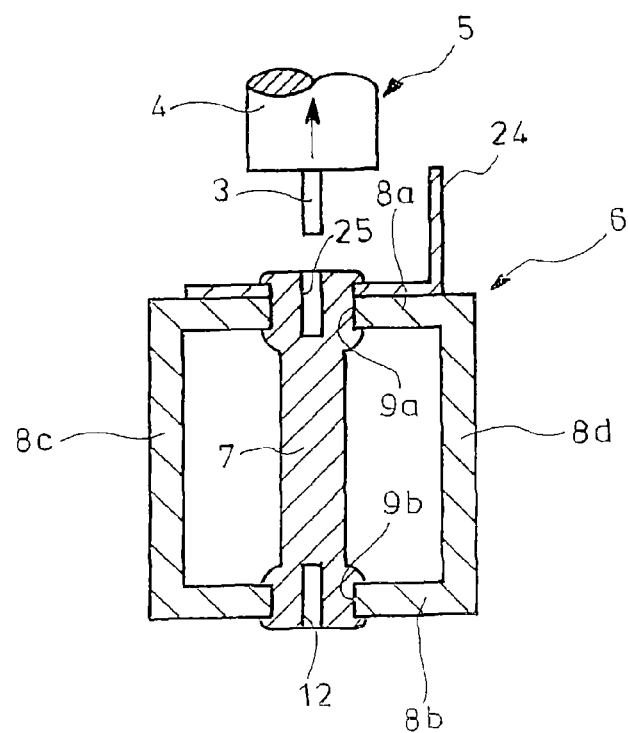

FIG. 3 is directed to a third embodiment of a structure for joining members according to the invention in which parts similar to those in FIG. 1 are represented by the same reference numerals.

In this embodiment, the plastic flow portion of the tip end of the auxiliary member 7 is allowed to solidify via the above-mentioned processing (b) of FIG. 1. Then, the members 6 and 7 are turned inside out, the joining tool 5 facing the base end of the auxiliary member 7, an additional member 24 being fitted over the auxiliary member 7 and rested on the first portion 8a of the main member 6.

The additional member 24 is made of steel.

The pin 3 is pushed, while the joining tool 5 is rotated, against the base end of the auxiliary member 7, so that the pin 3 gradually goes in the portion of the member softened due to frictional heat and plastic flow.

Soon, the end face of the shoulder 4 of the joining tool 5 is pushed against the base end of the auxiliary member 7, so that material derived from the base end of the auxiliary member 7 softened due to frictional heat and plastic flow is pushed inside the main member 6 via the hole 9a of the first portion 8a (see (a) of FIG. 3).

Then, the joining tool 5 is released from the auxiliary member 7 to allow into solidification the plastic flow portion of the member 7 clamping the additional member 24 and the first portion 8a of the main member 6 around the hole 9a of the first portion 8a in the direction of thickness thereof (see (b) of FIG. 3).

Thus, the plastic flow portions of the tip and base ends of the auxiliary member 7 clamp the second portion 8b of the main member 6 and the additional member 24 and first portion 8a of the main member 6, respectively, attaining locally enhanced stiffness of the main member 6 and attachment of the additional member 24 concurrently, leading to reduction in number of procedures for assembling members.

Holes 12 and 25 of the tip and base ends of the auxiliary member 7 produced by release of the ingoing pin 3 of the joining tool 5 may be threaded for possible bolting of further members.

Figure 4:
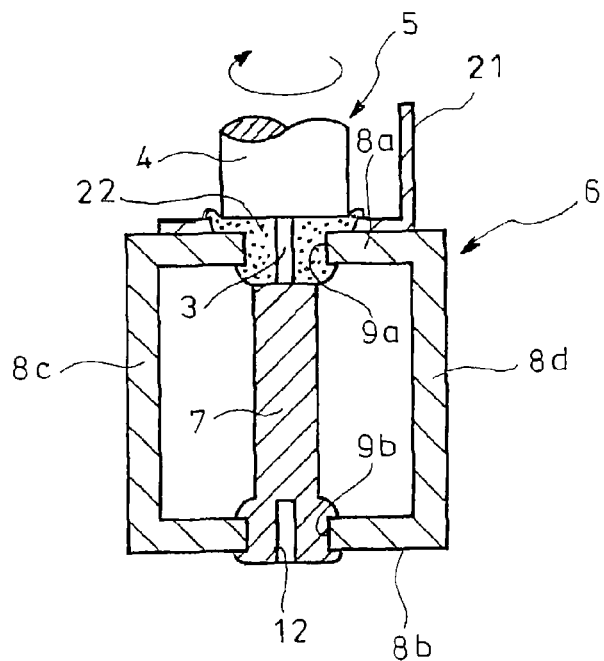
FIG. 4 includes schematic diagrams showing construction sequence of a fourth embodiment of a structure for joining members according to the invention.
Figure 4:
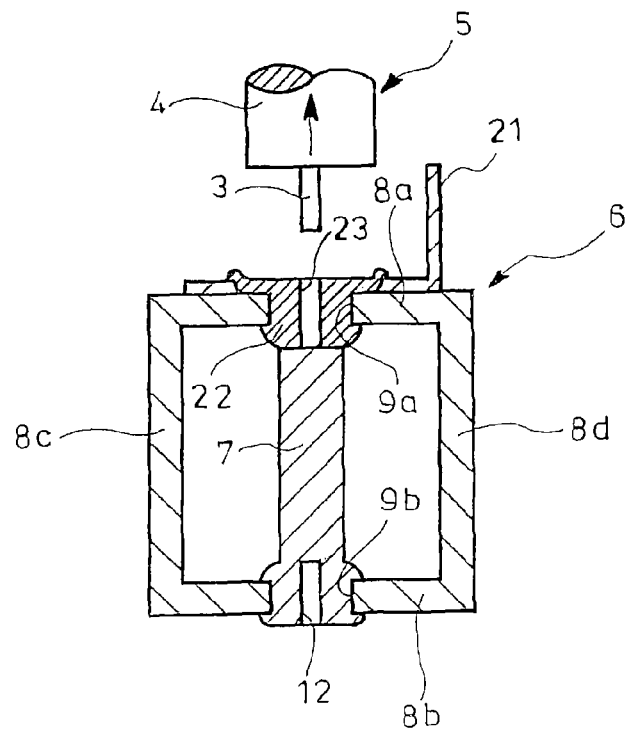

FIG. 4 is directed to a fourth embodiment of a structure for joining members according to the invention in which parts similar to those in FIG. 1 are represented by the same reference numerals.

In this embodiment, the plastic flow portion of the tip end of the auxiliary member 7 is allowed to solidify via the above-mentioned processing (b) of FIG. 1. Then, the members 6 and 7 are turned inside out, the joining tool 5 facing the base end of the auxiliary member 7, an additional member 24 being fitted over the auxiliary member 7 and rested on the first portion 8a of the main member 6.

The additional member 21 is made of aluminum alloy.

The pin 3 is pushed, while the joining tool 5 is rotated, against the base end of the auxiliary member 7, so that the pin 3 gradually goes in the portion of the member softened due to frictional heat and plastic flow.

Soon, the end surface of the shoulder 4 of the joining tool 5 is pushed against the base end of the auxiliary member 7 and the additional member 21, so that the member 21 is also softened due to frictional heat and plastic flow. As a result, an assimilation layer 22 derived from the additional member 21 and from the base end of the auxiliary member 7 is produced in a softened state around the pin 3 of the joining tool 5 (see (a) of FIG. 4).

Then, the joining tool 5 is released from the members 6 and 21 and from the additional member 21 to allow the assimilation or plastic flow layer 22 to solidify (see (b) of FIG. 4).

Thus, the plastic flow portion of the tip end of the auxiliary member 7 and the assimilation layer 22 clamp the second and first portions 8b and 8a of the main member 6, respectively, attaining locally enhanced stiffness of the main member 6 and attachment of the additional member 21 concurrently, leading to reduction in number of procedures for assembling the members.

Holes 12 and 23 of the tip and base ends of the auxiliary member 7 produced by release of the ingoing pin 3 of the joining tool 5 may be threaded for possible bolting of further members.

Figure 5:
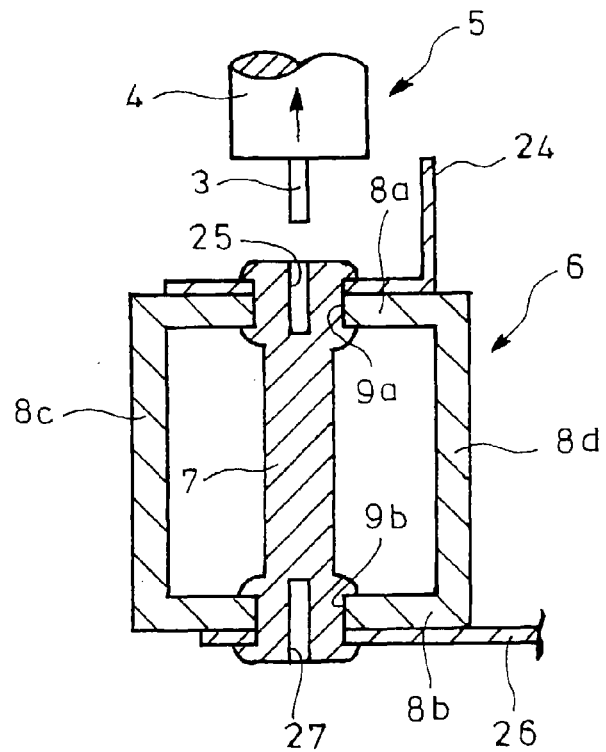
FIG. 5 is a schematic diagram showing construction sequence of a fifth embodiment of a structure for joining members according to the invention.

FIG. 5 is directed to a fifth embodiment of a structure for joining members according to the invention in which parts similar to those in FIG. 3 are represented by the same reference numerals.

In this embodiment, in addition to the additional member 24 fitted over the main member 6, an additional member 26 made of steel is fitted over the tip end of the auxiliary member 7, the additional member 26 and the second portion 8b of the main member 6 being clamped by the plastic flow portion of the auxiliary member 7.

Thus, when the stiffness of the main member 6 is locally enhanced, attachment of the additional members 24 and 26 is also completed, thereby reducing in number the procedures for assembling the members.

Holes 27 and 25 of the tip and base ends of the auxiliary member 7 produced by release of the ingoing pin of the joining tool 5 may be threaded for possible bolting of further members.

Figure 6:
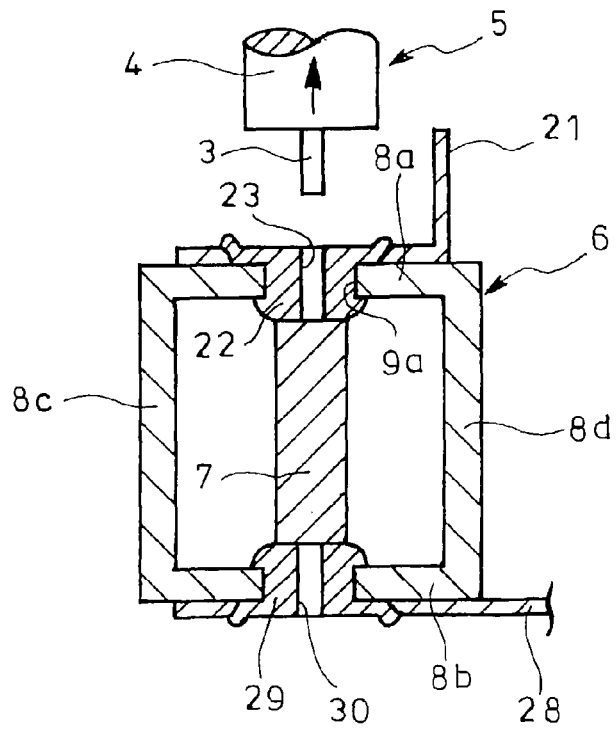
FIG. 6 is a schematic diagram showing construction sequence of a sixth embodiment of a structure for joining members according to the invention.

FIG. 6 is directed to a sixth embodiment of a structure for joining members according to the invention in which parts similar to those in FIG. 4 are represented by the same reference numerals.

In this embodiment, in addition to the additional member 21 fitted over the main member 6, an additional member 28 made of aluminum alloy is fitted over the tip end of the auxiliary member 7, the second portion 8b of the main member 6 is clamped by an and the assimilation layer 29 constituted by the plastic flow portions of the auxiliary member 7 and of the additional member 21.

Thus, when the stiffness of the main member 6 is locally enhanced, attachment of the additional members 21 and 28 is completed concurrently, leading to reduction in number of procedures for assembling the members.

Holes 30 and 23 of the tip and base ends of the auxiliary member 7 produced by release of the ingoing pin of the joining tool 5 may be threaded for possible bolting of further members.

Figure 7:
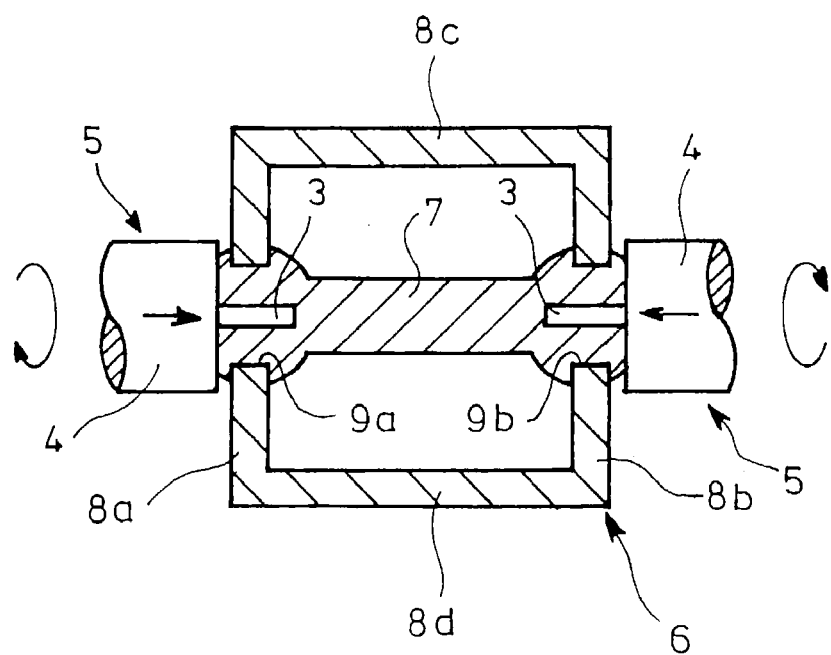
FIG. 7 is a schematic diagram showing alternative of the construction sequence of a structure for joining members according to the invention.

FIG. 7 is directed to an alternative of construction sequence of a structure for joining members according to the invention in which parts similar to those in FIG. 1 are represented by the same reference numerals.

In this embodiment, the pin 3 is pushed, while the joining tool 5 is rotated, against the tip end of the auxiliary member 7, so that the material of the auxiliary member 7 softened due to frictional heat and plastic flow is deformed and pushed inside the main member 6 via the hole 9b of the second portion 8b. In parallel therewith, a pin 3 of a further joining tool 5 is pushed, while being rotated, against the base end of the auxiliary member 7. Thus, while the material of the auxiliary member 7 softened due to frictional heat and plastic flow is deformed, it is pushed inside the main member 6 via the hole 9a of the first portion 8a. Then, the respective joining tools 5 are removed from the auxiliary member 7 to allow into solidification the plastic flow portions of the auxiliary member 7 and clamping the second and first portions 8b and 8a of the main member 6, respectively.

The above is applicable not only to the structure for joining members shown in FIG. 1 but also to the structure for joining members as shown in any of FIGS. 2-6.

It is to be understood that a method and a structure for joining members according to the invention are not limited to the above embodiments and that various changes and modifications may be made without departing from the scope of the invention. For example, a cylindrical joining tool with no pin may be employed.

INDUSTRIAL APPLICABILITY

A method and a structure for joining members according to the invention may be applicable to joining and assembling of a variety of parts.

The invention claimed is:

1. A method of joining members, comprising:
   forming a first hole that extends through a first surface and second surface on a first portion of a main member;
   forming a second hole that extends through a third surface and a fourth surface on a second portion of the main member, the second hole and second portion being opposite to said first hole and first portion;
   inserting an auxiliary member, including a tip end and a base end, into the first and second holes such that the tip and base ends are disposed in the second and first holes of the second and first portions of the main member, respectively;
   rotating and pushing a joining tool against the tip end of the auxiliary member to clamp the second portion of the main member in a direction of thickness thereof via softening of material of the auxiliary member due to frictional heat and plastic flow;
   releasing the joining tool from the auxiliary member to allow the material of the auxiliary member to solidify;

rotating and pushing the joining tool against the base end of the auxiliary member to clamp the first portion of the main member in the direction of thickness thereof via softening of the material of the auxiliary member due to frictional heat and plastic flow; and releasing the joining tool from the auxiliary member to allow the material of the auxiliary member to solidify, wherein, the steps of rotating and pushing the joining tool against the tip and base ends radially deform the tip and base ends toward the second and first portions of the main member, respectively, such that a material of the auxiliary member at the tip end clamps against the third and fourth surfaces of the second portion by clamping the third and fourth surfaces within the tip end, and a material of the auxiliary member at the base end clamps against the first and second surfaces of the first portion by clamping the first and second surfaces within the base end.

2. A structure for joining members, comprising:

a main member including first and second portions having separate first and second holes, respectively, opposite to each other, the first hole extending through a first surface and a second surface of the first portion of the main member, and the second hole extending through a third surface and a fourth surface of the second portion of the main member; and an auxiliary member including a tip end and a base end, the tip and base ends being disposed in the second and first holes, respectively, of the second and first portions of the main member, respectively, wherein the tip and base ends of said auxiliary member clamp the second and first portions of said main member, respectively, in a direction of thickness thereof due to frictional heat and plastic flow, and wherein the tip and base ends of the auxiliary member are radially deformed toward the second and first portions of the main member, respectively, such that a material of the auxiliary member at the tip end clamps against the third and fourth surfaces of the second portion by clamping the third and fourth surfaces within the tip end, and a material of the auxiliary member at the base end clamps against the first and second surfaces of the first portion by clamping the first and second surfaces within the base end.

3. A structure for joining members, comprising:

a main member including first and second portions having separate first and second holes, respectively, opposite to each other, the first hole extending through a first surface and a second surface of the first portion of the main member, and the second hole extending through a third surface and a fourth surface of the second portion of the main member;

an auxiliary member including a tip end and a base end, the tip and base ends being disposed in the second and first holes, respectively, of the second and first portions of the main member, respectively; and a flange disposed on the base end of the auxiliary member so as to engage with the first portion of the main member, wherein the tip and base ends of said auxiliary member clamp the second and first portions of said main member, respectively, in a direction of thickness thereof due to frictional heat and plastic flow, and wherein the tip and base ends of the auxiliary member are radially deformed toward the second and first portions of the main member, respectively, such that a material of the auxiliary member at the tip end clamps against the third and fourth surfaces of the second portion by clamping the third and fourth surfaces within the tip end, and a material of the auxiliary member at the base end clamps against the first and second surfaces of the first portion by clamping the first and second surfaces within the base end.

* * * * *